United States Patent
Kumar et al.

(10) Patent No.: US 8,705,733 B2
(45) Date of Patent: *Apr. 22, 2014

(54) UNIQUE IDENTIFIER PER CHIP FOR DIGITAL AUDIO/VIDEO DATA ENCRYPTION/DECRYPTION IN PERSONAL VIDEO RECORDERS

(75) Inventors: Nishit Kumar, San Jose, CA (US); David Auld, San Jose, CA (US)

(73) Assignee: CSR Technology Inc., San Jose, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 12/945,721

(22) Filed: Nov. 12, 2010

(65) Prior Publication Data

US 2011/0058669 A1  Mar. 10, 2011

Related U.S. Application Data

(63) Continuation of application No. 10/371,313, filed on Feb. 20, 2003, now Pat. No. 7,835,520.

(51) Int. Cl.
  *H04L 29/06* (2006.01)
  *H04L 9/08* (2006.01)
  *G06F 21/30* (2013.01)
(52) U.S. Cl.
  CPC ............ *H04L 9/0866* (2013.01); *H04L 9/088* (2013.01); *G06F 21/30* (2013.01)
  USPC ................ 380/44; 380/200; 726/26
(58) Field of Classification Search
  CPC ........ H04L 9/0866; H04L 9/088; G06F 21/30
  USPC ................ 380/210, 200, 44; 726/26
  See application file for complete search history.

(56) References Cited

U.S. PATENT DOCUMENTS 5,222,133 A * 6/1993 Chou et al. .................... 705/55
5,237,614 A * 8/1993 Weiss ............................ 713/159
5,416,840 A * 5/1995 Cane et al. .................... 705/52

(Continued)

FOREIGN PATENT DOCUMENTS

| EP | 1253740 | 10/2002 |
|---|---|---|
| WO | 0193000 A2 | 12/2001 |
| WO | 0229565 | 4/2002 |
| WO | 02102075 A1 | 12/2002 |

OTHER PUBLICATIONS

Office Communication for European Patent Application No. 04713370.7, dated Jun. 20, 2008.
Analog Devices, ADSP-2141L Data Sheet, Jan. 20, 2000.

(Continued)

*Primary Examiner* — David Garcia Cervetti
(74) *Attorney, Agent, or Firm* — Frommer Lawrence & Haug LLP; John W. Branch

(57) ABSTRACT

The invention provides techniques to implement unique identifier for an integrated chip and how this ID can be employed to enhance the security of content in personal video recorder type systems. The storage device can be a hard disk, a removable storage medium or any other type of storage medium. An integrated circuit (IC) within the personal video recorder stores a unique identifier that is used in for encryption and decryption of data stored on the storage device. Several embodiments are disclosed herein that maintain the secrecy of the unique ID such that it is not easily accessible thereby defeating the security scheme.

20 Claims, 9 Drawing Sheets

(56) References Cited

U.S. PATENT DOCUMENTS

| | | | |
|---|---|---|---|
| 5,563,950 A | 10/1996 | Easter et al. | |
| 5,590,192 A * | 12/1996 | Lovett et al. | 705/51 |
| 5,652,838 A * | 7/1997 | Lovett et al. | 726/30 |
| 5,706,292 A | 1/1998 | Merritt | |
| 5,719,943 A * | 2/1998 | Amada et al. | 380/202 |
| 5,742,512 A * | 4/1998 | Edge et al. | 702/57 |
| 5,768,382 A * | 6/1998 | Schneier et al. | 380/251 |
| 5,784,459 A | 7/1998 | Devarakonda et al. | |
| 5,799,080 A | 8/1998 | Padmanabhan et al. | |
| 5,881,155 A | 3/1999 | Rigal | |
| 5,896,499 A | 4/1999 | McKelvey | |
| 5,933,497 A * | 8/1999 | Beetcher et al. | 705/59 |
| 5,937,395 A * | 8/1999 | Iwamura | 705/30 |
| 5,970,143 A * | 10/1999 | Schneier et al. | 713/181 |
| 6,061,451 A * | 5/2000 | Muratani et al. | 380/201 |
| 6,067,622 A * | 5/2000 | Moore | 726/31 |
| 6,219,157 B1 | 4/2001 | Shikakura et al. | |
| 6,233,567 B1 * | 5/2001 | Cohen | 705/59 |
| 6,278,782 B1 * | 8/2001 | Ober et al. | 380/264 |
| 6,347,846 B1 | 2/2002 | Nakamura | |
| 6,398,245 B1 * | 6/2002 | Gruse et al. | 280/228 |
| 6,418,421 B1 * | 7/2002 | Hurtado et al. | 705/54 |
| 6,470,454 B1 * | 10/2002 | Challener et al. | 726/17 |
| 6,550,011 B1 * | 4/2003 | Sims, III | 713/193 |
| 6,647,328 B2 | 11/2003 | Walker | |
| 6,654,465 B2 * | 11/2003 | Ober et al. | 380/264 |
| 6,691,149 B1 * | 2/2004 | Yokota et al. | 709/201 |
| 6,711,264 B1 * | 3/2004 | Matsumoto et al. | 380/283 |
| 6,799,277 B2 * | 9/2004 | Colvin | 726/22 |
| 6,895,504 B1 * | 5/2005 | Zhang et al. | 713/175 |
| 6,914,637 B1 * | 7/2005 | Wolf et al. | 348/473 |
| 6,986,063 B2 * | 1/2006 | Colvin | 726/28 |
| 6,986,150 B2 * | 1/2006 | Spruit et al. | 720/718 |
| 6,993,137 B2 * | 1/2006 | Fransdonk | 380/279 |
| 7,080,039 B1 * | 7/2006 | Marsh | 705/51 |
| 7,107,458 B2 | 9/2006 | Oishi et al. | |
| 7,107,462 B2 * | 9/2006 | Fransdonk | 713/193 |
| 7,124,938 B1 | 10/2006 | Marsh | |
| 7,174,568 B2 * | 2/2007 | Chatani et al. | 726/27 |
| 7,181,129 B2 * | 2/2007 | Saito | 386/259 |
| 7,228,182 B2 * | 6/2007 | Healy et al. | 607/60 |
| 7,228,427 B2 * | 6/2007 | Fransdonk | 713/176 |
| 7,228,567 B2 * | 6/2007 | Serkowski et al. | 726/30 |
| 7,231,050 B1 * | 6/2007 | Harris | 380/286 |
| 7,237,255 B2 * | 6/2007 | Fransdonk | 726/3 |
| 7,246,246 B2 * | 7/2007 | Kupka et al. | 713/189 |
| 7,313,828 B2 * | 12/2007 | Holopainen | 726/29 |
| 7,356,709 B2 * | 4/2008 | Gunyakti et al. | 713/193 |
| 7,404,084 B2 * | 7/2008 | Fransdonk | 713/176 |
| 7,664,709 B2 * | 2/2010 | Chatani et al. | 705/59 |
| 7,818,067 B2 * | 10/2010 | Healy et al. | 607/60 |
| 2001/0030932 A1 * | 10/2001 | Spruit et al. | 369/275.2 |
| 2001/0034712 A1 * | 10/2001 | Colvin | 705/52 |
| 2001/0044780 A1 * | 11/2001 | Miyazaki et al. | 705/53 |
| 2001/0051928 A1 * | 12/2001 | Brody | 705/52 |
| 2001/0051996 A1 | 12/2001 | Cooper et al. | |
| 2002/0010863 A1 * | 1/2002 | Mankefors | 713/189 |
| 2002/0031352 A1 * | 3/2002 | Saito | 396/429 |
| 2002/0053082 A1 * | 5/2002 | Weaver et al. | 725/46 |
| 2002/0064188 A1 | 5/2002 | Mizobata | |
| 2002/0076204 A1 * | 6/2002 | Nakano et al. | 386/94 |
| 2002/0080960 A1 * | 6/2002 | Kanayama et al. | 380/201 |
| 2002/0095382 A1 * | 7/2002 | Taoka et al. | 705/50 |
| 2002/0104019 A1 * | 8/2002 | Chatani et al. | 713/201 |
| 2002/0114461 A1 * | 8/2002 | Shimada et al. | 380/201 |
| 2002/0114466 A1 * | 8/2002 | Tanaka et al. | 380/232 |
| 2002/0116632 A1 * | 8/2002 | Itoh et al. | 713/200 |
| 2002/0150251 A1 * | 10/2002 | Asano et al. | 380/277 |
| 2002/0164022 A1 * | 11/2002 | Strasser et al. | 380/201 |
| 2002/0164034 A1 * | 11/2002 | Asano et al. | 380/278 |
| 2002/0164035 A1 * | 11/2002 | Yokota et al. | 380/278 |
| 2002/0166056 A1 * | 11/2002 | Johnson et al. | 713/193 |
| 2003/0009681 A1 * | 1/2003 | Harada et al. | 713/193 |
| 2003/0046566 A1 * | 3/2003 | Holopainen | 713/193 |
| 2003/0061477 A1 * | 3/2003 | Kahn et al. | 713/150 |
| 2003/0076955 A1 * | 4/2003 | Alve et al. | 380/201 |
| 2003/0079042 A1 * | 4/2003 | Yamanaka et al. | 709/247 |
| 2003/0081786 A1 * | 5/2003 | Nakano et al. | 380/277 |
| 2003/0081788 A1 * | 5/2003 | Simpson et al. | 380/278 |
| 2003/0081792 A1 * | 5/2003 | Nakano et al. | 380/286 |
| 2003/0098911 A1 | 5/2003 | Fujii et al. | |
| 2003/0110375 A1 * | 6/2003 | Colvin | 713/156 |
| 2003/0140227 A1 * | 7/2003 | Asano et al. | 713/157 |
| 2003/0142824 A1 * | 7/2003 | Asano et al. | 380/277 |
| 2003/0142826 A1 * | 7/2003 | Asano | 380/277 |
| 2003/0154390 A1 * | 8/2003 | Yamauchi et al. | 713/193 |
| 2003/0161335 A1 * | 8/2003 | Fransdonk | 370/401 |
| 2003/0161473 A1 * | 8/2003 | Fransdonk | 380/277 |
| 2003/0161474 A1 * | 8/2003 | Matsuzaki et al. | 380/277 |
| 2003/0161476 A1 * | 8/2003 | Fransdonk | 380/282 |
| 2003/0163684 A1 * | 8/2003 | Fransdonk | 713/153 |
| 2003/0163712 A1 * | 8/2003 | LaMothe et al. | 713/189 |
| 2003/0165241 A1 * | 9/2003 | Fransdonk | 380/258 |
| 2003/0167392 A1 * | 9/2003 | Fransdonk | 713/156 |
| 2003/0177093 A1 * | 9/2003 | Hirano et al. | 705/50 |
| 2003/0177401 A1 * | 9/2003 | Arnold et al. | 713/202 |
| 2003/0182565 A1 * | 9/2003 | Nakano et al. | 713/193 |
| 2003/0204738 A1 | 10/2003 | Morgan | |
| 2004/0010643 A1 * | 1/2004 | Thomas, III | 710/104 |
| 2004/0025038 A1 * | 2/2004 | Eiserling et al. | 713/193 |
| 2004/0034775 A1 * | 2/2004 | Desjardins et al. | 713/170 |
| 2004/0034785 A1 * | 2/2004 | Tai et al. | 713/189 |
| 2004/0044631 A1 * | 3/2004 | Walker et al. | 705/59 |
| 2004/0044901 A1 * | 3/2004 | Serkowski et al. | 713/200 |
| 2004/0068648 A1 | 4/2004 | Lewis et al. | |
| 2004/0125954 A1 * | 7/2004 | Riebe et al. | 380/231 |
| 2004/0165725 A1 | 8/2004 | Kumar et al. | |
| 2005/0100161 A1 * | 5/2005 | Husemann et al. | 380/200 |
| 2005/0203582 A1 * | 9/2005 | Healy et al. | 607/31 |
| 2005/0264472 A1 | 12/2005 | Rast | |

OTHER PUBLICATIONS

International Search Report and Written Opinion for International Patent Application No. PCT/US04/005121, mailed Nov. 18, 2004.

\* cited by examiner

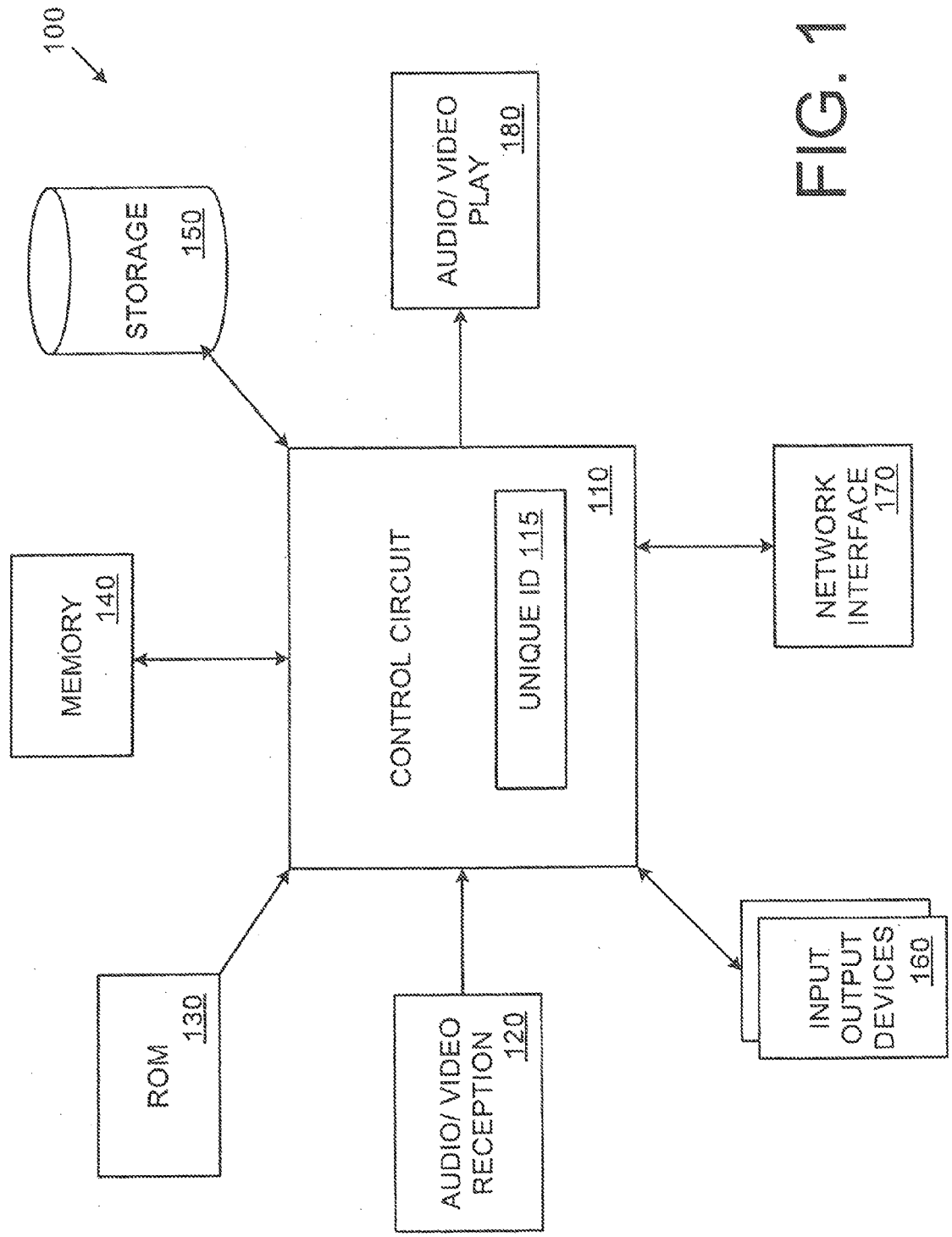

UNIQUE IDENTIFIER PER CHIP FOR DIGITAL AUDIO/VIDEO DATA ENCRYPTION/DECRYPTION IN PERSONAL VIDEO RECORDERS

CROSS-REFERENCE TO RELATED APPLICATION

This utility patent application is a Continuation of U.S. patent application Ser. No. 10/371,313, now U.S. Pat. No. 7,835,520, filed on Feb. 20, 2003, the benefit of which is claimed under 35 U.S.C. §120, and is further incorporated herein by reference.

FIELD

The invention relates to techniques of implementing a unique identifier for individual integrated circuit chips for use in data encryption and decryption. The disclosure describes use of a unique identifier to increase the security of content to be stored on long-term storage media in a personal video recorder type system.

BACKGROUND

When audio/video data is processed by various circuits and components that provide functionality in a personal video recorder type system, some or all of the data is typically stored on a long-term storage device such as a hard disk. In order to provide copyright and licensing protection, it is desirable to provide encryption to protect the data from unauthorized copying and use. Typically, standard algorithms for data scrambling are used so that the security strength of the algorithm is well known and widely accepted. It is therefore the key(s) used by these algorithms that largely govern the security level of the whole system.

One common encryption algorithm is the Data Encryption Standard (DES, or Single-DES). However, Single-DES can be "cracked" within a few hours using commonly available computing resources. A further refinement referred to as Triple-DES provides significant strength improvement (a factor of $2^{56}$). See, for example, Kaufman, Perlman and Speciner "*Network Security*," Ch. 3, page 63, March, 1995 by Prentice Hall. Another well-known encryption algorithm is the Advanced Encryption System (AES). See, for example, Elaine Barker "*NIST Cryptographic Toolkit*", published Oct. 16, 2000.

The hardware (e.g., integrated circuit) implementation of standard cryptographic algorithms is well known. However, in many situations, for example, personal video recording, each system must be uniquely distinguishable so that data written to the storage device of a system cannot be copied and used by another system, that may or may not be authorized. In other words, it is desirable that each system encrypt the data stored by that system with a key that is different from other systems. Furthermore, such unique keys can also be used to encrypt and protect movement of shared/public/group keys outside of an integrated circuit.

The unique key or ID must be securely stored either on the integrated circuit or on a secure device outside the integrated circuit. If the key is stored on an external device a secure transfer between the device and the integrated circuit performing the cryptographic operations must be provided.

In general, keys that are used to encrypt content to be stored on long-term and/or removable storage devices require a higher degree of protection. This is because, unlike broadcast communication scrambling systems, these keys do not change as often with time. Such keys are typically used for the life of the system or a session of the system. Architectures in which keys change over time require that the key be stored, typically on an external memory device. It is this memory that then becomes the weak point of the system.

BRIEF DESCRIPTION OF THE DRAWINGS

The invention is illustrated by way of example, and not by way of limitation, in the figures of the accompanying drawings in which like reference numerals refer to similar elements.

FIG. 1 is one embodiment of an audio/video system in which the unique identifier (ID) can be used.

DETAILED DESCRIPTION

Figure 2A:
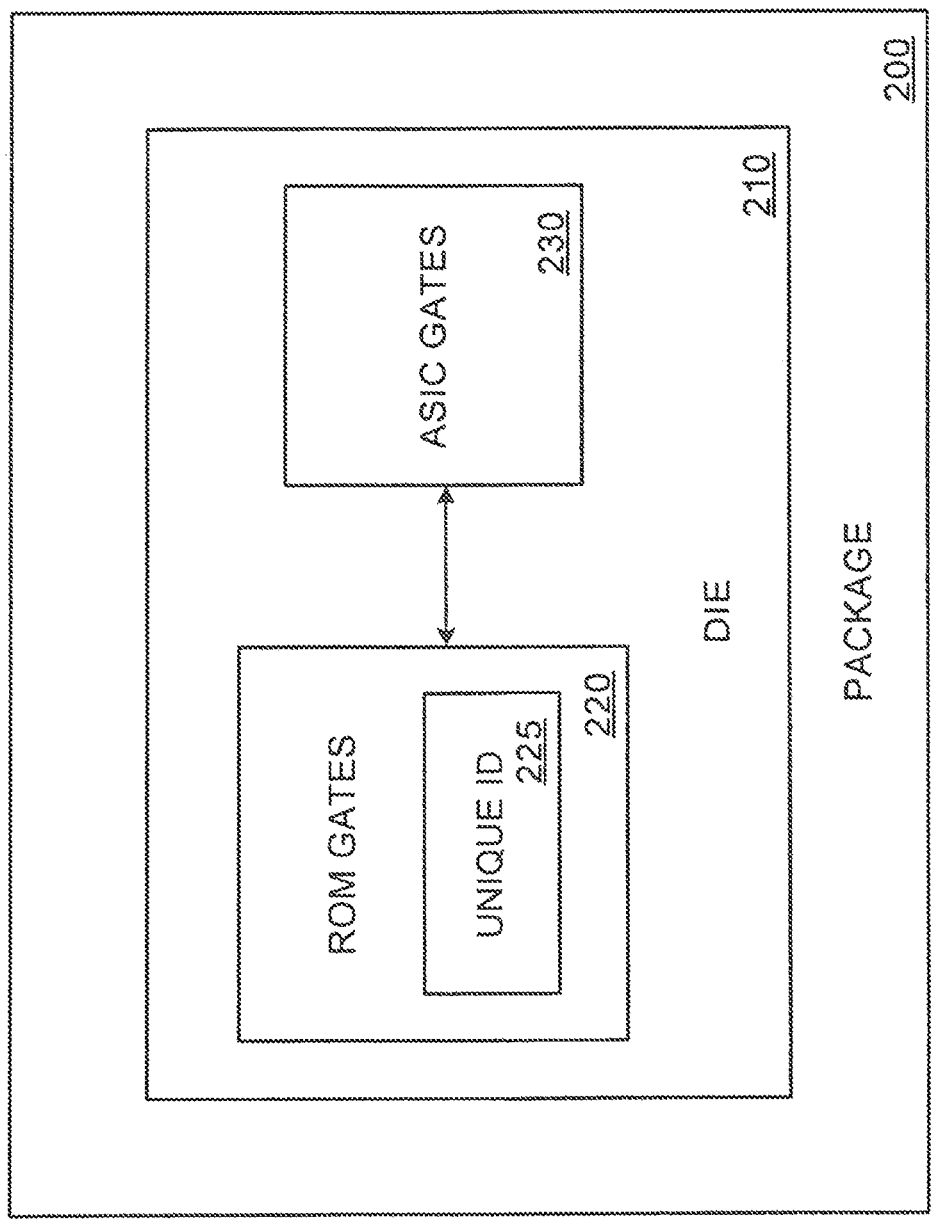
FIG. 2a is a block diagram of an integrated circuit and a read-only memory (ROM) to store a unique ID on a common die.

Techniques for secure storage of audio/video content in a personal audio/video recorder-type system are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The invention provides techniques for storing content securely in personal video recorder type systems. The storage device can be a hard disk, a removable storage medium, or any other type of storage medium. The integrated circuit (IC) to interface with the storage device uses a unique ID to encrypt or decrypt the content. Several embodiments are disclosed herein that maintain the secrecy of the unique ID such that is not easily accessible thereby defeating the encryption scheme.

FIG. 1 is a block diagram of a basic audio/video system. The system of FIG. 1 can be, for example, an audio/video recorder-type system. Audio/video (A/V) system 100 can allow a user to record and playback audio/video data transmitted as television broadcasts, radio broadcasts, satellite broadcasts, video-on-demand, etc.

A/V system 100 includes processing, storage, and communication devices that provide audio/video reception, playback, audio/video data processing, and data storage functionality. A/V system 100 includes control circuit 110 to control data flow and to provide necessary interfaces to communicate with other devices/components. In one embodiment, control circuit 110 is an application specific integrated circuit (ASIC); however, in other embodiments, control circuit can be implemented as multiple integrated circuits and/or can be a general-purpose control circuit. The processing capabilities of control circuit 110 generally include transport data decryption, program de-multiplexing, MPEG/DV decoding, video scaling, graphics functions, blending, color space and format conversion, audio mixing and cross-fading, and content encryption/decryption.

A/V system 100 includes audio/video reception device 120 that provides compressed or uncompressed audio/video data stream to control circuit 110. The A/V reception device 120 can include, but is not limited to, satellite/terrestrial tuners, IEEE 1394 devices, audio/video decoder devices, etc. Control circuit 110 provides the output signals to A/V play device 180 which can be a high-definition or NTSC/PAL television, a monitor, or any other type of device capable of displaying video and playing audio.

A/V system 100 includes read-only memory (ROM) 130 (or other static storage device) to store static information and instructions. This, for example, could be instructions required for booting up system 100 and initialize the components to their proper state and configuration. A/V system 100 further includes memory 140 to store transient information and instructions to be executed by control circuit 110 or any other component of system 100. Memory 140 can also be used to store temporary variables of other intermediate information generated by control circuit 110 in processing audio/video data. Memory 140 can be any type of dynamic memory known in the art e.g., SDRAM or DDR.

Control circuit 110 may also be coupled to, or provide an interface for, input/output devices 160. Input/output devices 160 can include, but are not limited to, smart cards (e.g., for user entitlement control functions), infrared control devices (e.g., remote controls), and other storage and processing devices that can be controlled by standard interfaces (e.g., general purpose input/output (GPIO), local bus, PC). In order to facilitate content sharing, A/V system 100 can also include network interface 170. Network interface 170 can be any type of network interface (e.g., PCI bus, USB) that allows additional media to provide a source of audio/video data stream to the control circuit 110.

Storage device 150 is used to store audio/video content that is processed by control circuit 110 and can be any storage device known in the art, for example, magnetic disks or optical discs with corresponding drives. As described in greater detail below, storage device 150 is used to store audio/video content for delayed playback. In the embodiment of FIG. 1, while both memory 140 and storage device 150 are used to store data, the life of data stored on memory 140 is only transient. On the other hand, the life of content stored on storage device 150 is considerably longer.

Control circuit 110 uses unique ID 115 to encrypt data to be sent to storage device 150 for long-term storage. Various embodiments and techniques for implementing unique ID 115 are described in greater detail below.

In one embodiment, control circuit 110 includes an implementation of a Triple DES or AES encryption/decryption algorithm. The key used for the encryption/decryption operations is a 128-bit key stored as unique ID 115. Other key lengths can also be used. Control circuit 110 can use the unique ID 115 itself as the key value in the encryption operations and causes encrypted data to be stored on the storage device 150. Whenever required encrypted data retrieved from storage device 150 is decrypted using the unique ID 115.

FIG. 2*a* is a block diagram of an integrated circuit and a read-only memory (ROM) to store a unique ID on a common die. Integrated circuit 210 can be any type of circuit that provides functionality in addition to encryption/decryption and an interface to the storage device as described herein. Integrated circuit 210 causes encrypted data to be used by the personal audio/video system to be stored on a storage device.

Encryption is provided by using the unique ID 225, which is transferred from the ROM to the IC whenever required. This interface for the transfer of the ID is buried in the die and is not easily accessible. In one embodiment, unique ID 225 is used as a private key to be used in Triple DES or AES encryption algorithms. In alternate embodiments, other encryption algorithms and/or multiple IDs can be used. In one embodiment, ID 225 is unique among all personal audio/video devices. In an alternate embodiment, ID 225 is not absolutely unique, but sufficiently unique that the likelihood of two systems having the same ID interact is acceptably low.

In the embodiment of FIG. 2*a*, unique ID 225 is programmed and maintained at die fabrication time. This is a very secure implementation because unique ID 225 is not accessible from outside package 200. However, using current manufacturing processes, the embodiment of FIG. 2*a* is complex because the manufacturing of ROM and the IC may require different poly processes. Furthermore, the manufacturing yield of such a composite die may be low using current technology. Notwithstanding the manufacturing complexities, the embodiment of FIG. 2*a* provides a very secure implementation of unique ID per IC.

Figure 2B:
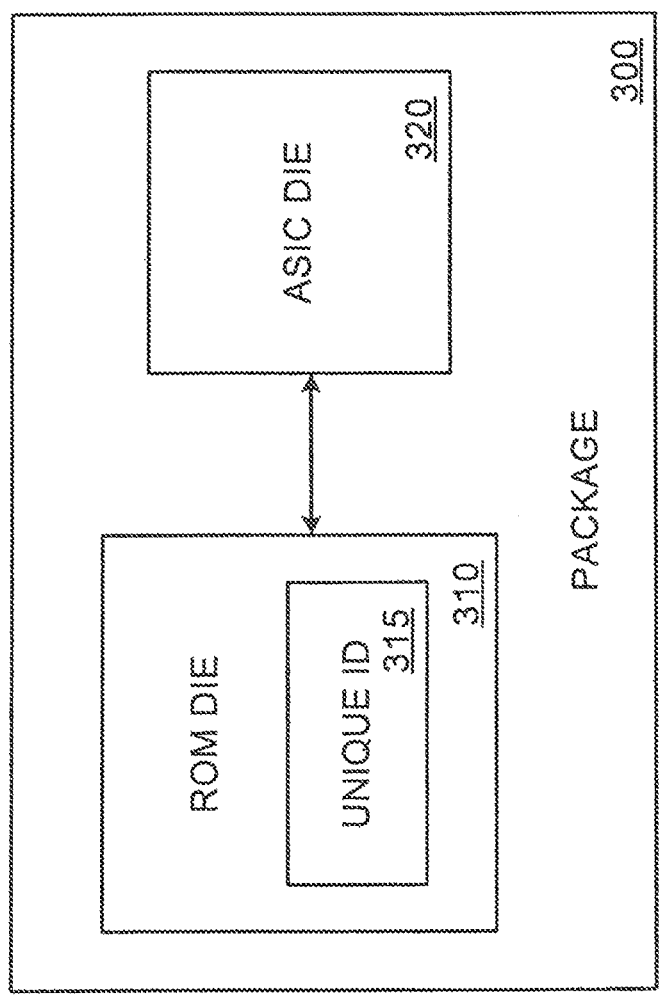
FIG. 2b is a block diagram of an integrated circuit and a read-only memory to store a unique identifier on different die in a single package.

FIG. 2*b* is a block diagram of an integrated circuit and a read-only memory to store a unique identifier on different die in a single package. The interface between the ASIC and the ROM is hidden inside the package. In one embodiment, ROM die 310 is manufactured to include unique ID 315 using a manufacturing process independent of the ASIC die 320. Both dies are enclosed in a single package 300.

Unique ID 315 is programmed during the manufacture of ROM die 310. The embodiment of FIG. 2*b* provides good security; however, it is less secure than the embodiment of FIG. 2*a*. The manufacturing of the two dies using different processes is less complex than the embodiment of FIG. 2*a* because processes can be separated and functional die from each process can be packaged together.

The embodiment of FIG. 2*b* may require more complex and more expensive packaging than the embodiment of FIG. 2*a* and the testing cost of the embodiment of FIG. 2*b* may be relatively high.

Figure 2C:
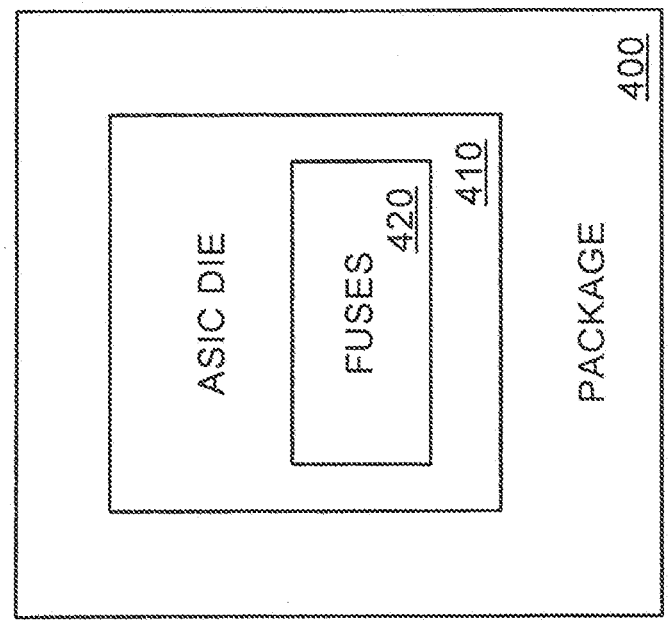
FIG. 2c is a block diagram of an integrated control circuit having a unique identifier stored in an array of fuses on the integrated circuit.

FIG. 2*c* is a block diagram of the unique ID stored in an array of fuses within the integrated circuit. ASIC die 410 is manufactured with an array of fuses 420 which are later appropriately blown to program an appropriate value. The fuses can be set, for example, by burning the fuses with a laser. The implementation of unique ID in the embodiment of FIG. 2*c* is very secure.

This implementation of unique ID would require custom design of the fuse cell arrays. Manufacturing is complex using current technology because the barrier metal of the fuse array is difficult to blow reliably. The embodiment of FIG. 2*c* would also be difficult to test during manufacturing because the fuse array does not store the unique ID until after the fuses are blown.

Figure 2D:
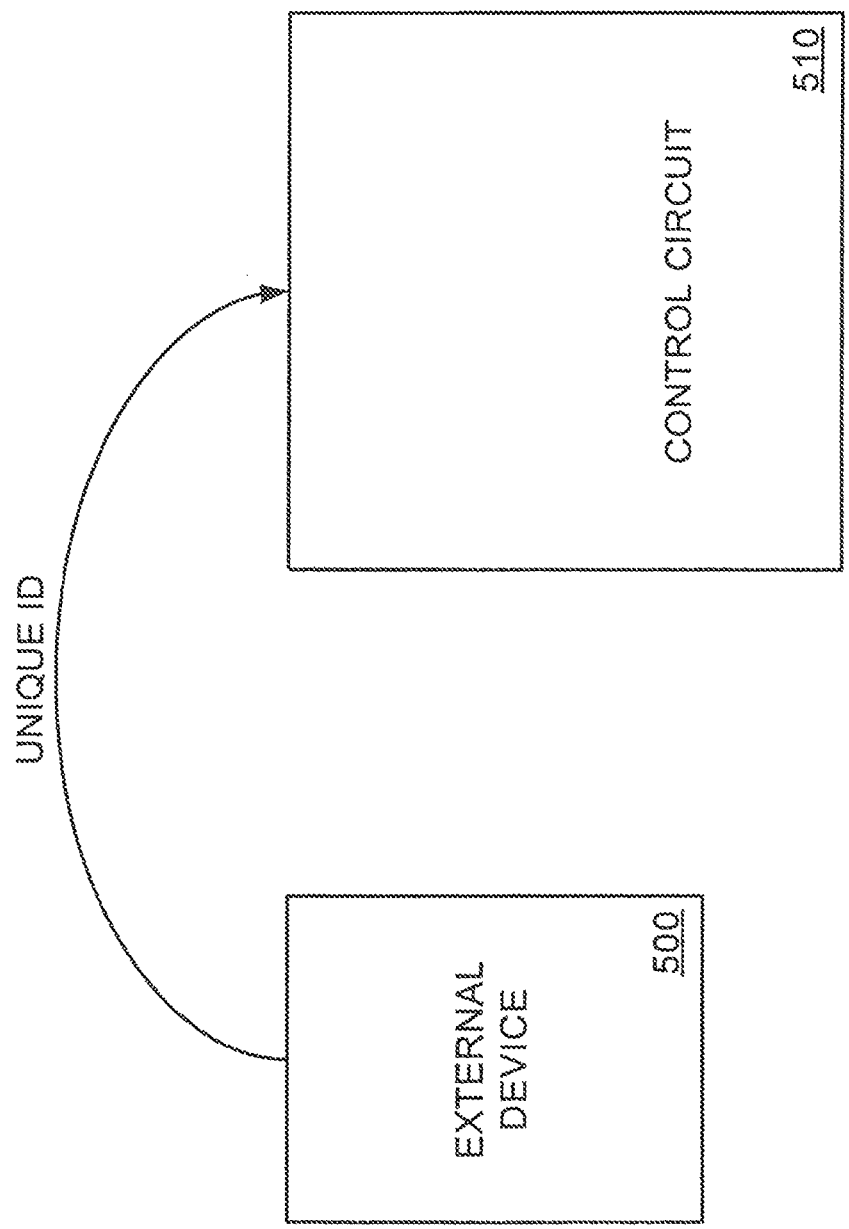
FIG. 2d is a block diagram of the implementation of unique ID in which the integrated circuit obtains the ID from an external source.

FIG. 2*d* is a block diagram of an integrated circuit obtaining the unique ID from an external device 500. In the embodiment of FIG. 2*d*, device 500 provides the unique ID to control circuit 510 over an interface, which uses this unique ID as described above.

External device 500 may be a standard or a proprietary one and is connected to the control circuit 510 using any appropriate interconnection scheme, whether proprietary or standard. For example, an I2C bus can be used, an ISO 7816-3 interface, or a SCSI Parallel Interface (SPI)-type link can be used. The I2C (Inter-IC) bus is a bi-directional two-wire serial bus that commonly used to provide a communication link between integrated circuits. Specifications and products related to the I2C bus are available from Phillips Corporation. There are three data transfer speeds for the I2C bus: standard, fast-mode, and high-speed mode. Standard is 100 kbps. Fast-mode is 400 kbps, and high-speed mode supports speeds up to 3.4 Mbps.

The ISO 7816 interface is described in detail in a document entitled "Integrated circuit(s) cards with contacts—Part 3: Electronic signals and transmission protocols," published by the International Organization for Standardization as document number 7816-3 in December 1997. One embodiment of a SPI is described in detail in the SCSI specifications available from IEEE.

Because the movement of the unique ID is in the clear, the embodiment of FIG. 2d suffers from the disadvantage that it is vulnerable to attacks against the interface between external device 500 and control circuit 510. Such attacks can be reduced by burying the traces of the interface during board design with these components, and choosing appropriate packaging techniques for components 500 and 510, particularly for the pins corresponding to the interface. However, the embodiment of FIG. 2d provides the advantage that little or no custom manufacturing and/or reliability testing is required.

Figure 2E:
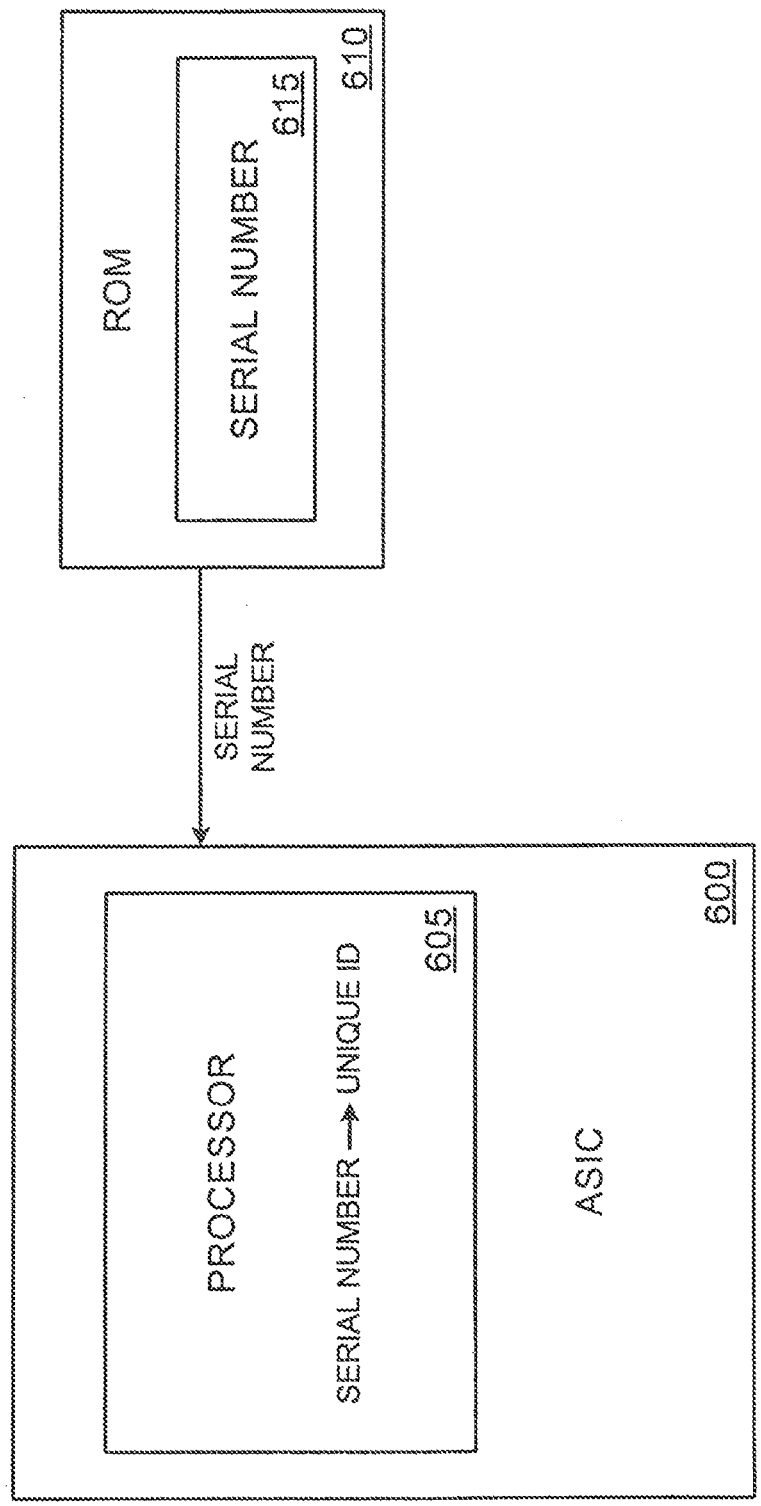
FIG. 2e is a block diagram of an integrated circuit that derives a unique ID from a system value.

FIG. 2e is a block diagram of a scheme in which the integrated circuit derives the unique ID from a system value. The system value can be, for example, a serial number from either a hardware component of the system or from a software application installed on the system.

In the embodiment of FIG. 2e, ROM 610 includes serial number 615 or other ID that is used to generate a unique ID to be used as described above. ROM 610 provides serial number 615 to ASIC 600, which includes processor 605. Processor 605 generates the unique ID from the serial number. The unique ID can be generated, for example, by using a hash function on the serial number to generate a different number to be used as the unique ID.

The disadvantage of the embodiment of FIG. 2e is that serial numbers are typically shorter (e.g., 32 bits) than the desired keys lengths for the encryption/decryption algorithm (e.g., 128 bits). The security of the system hinged on keys derived from shorter serial numbers or other system values is typically less. However, most systems have multiple serial numbers that are unique IDs for components of the system. A combination of these serial numbers can be employed to make the relatively inexpensive embodiment of FIG. 2e a secure enough scheme of implementing unique ID.

Figure 2F:
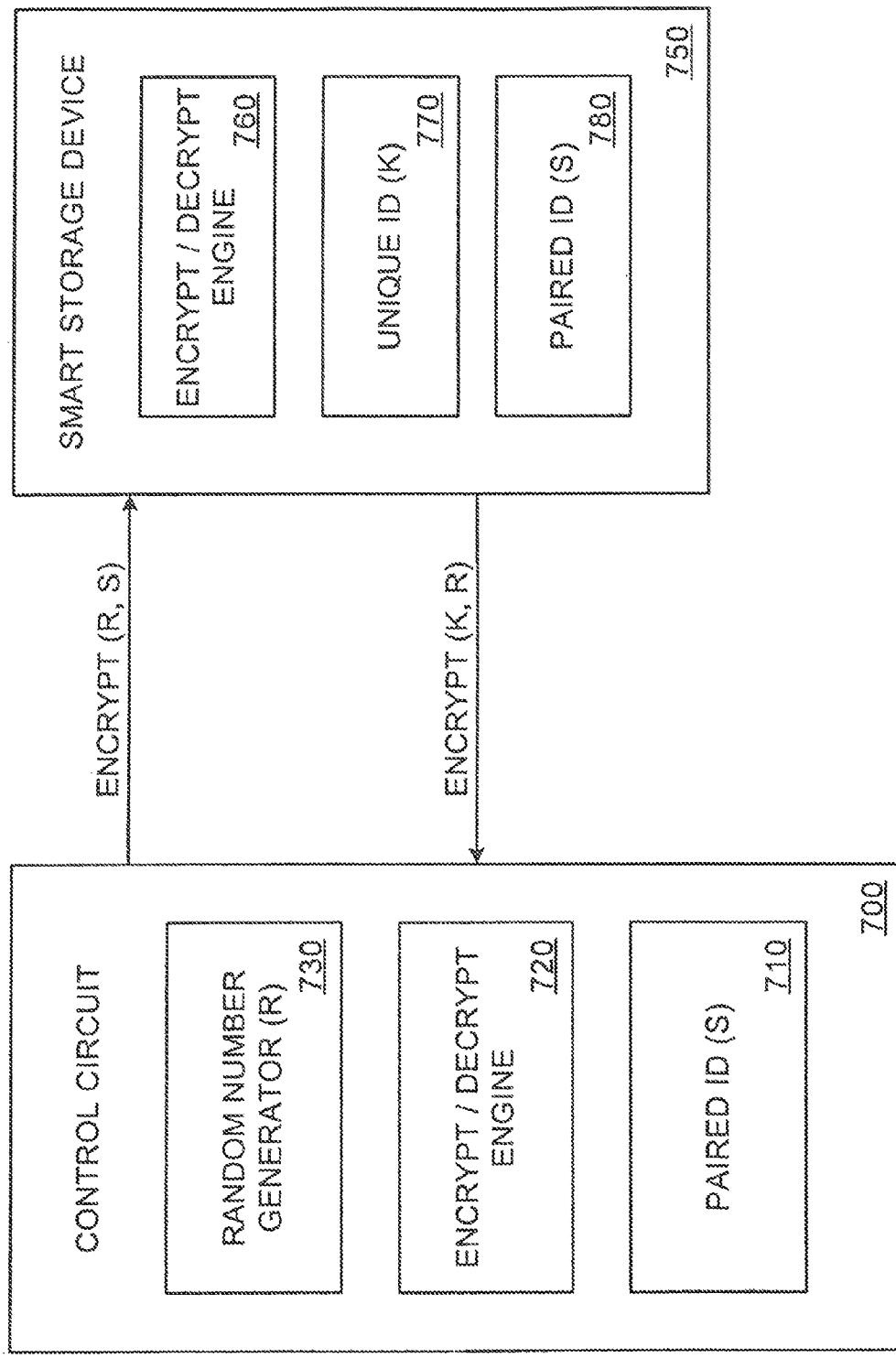
FIG. 2f is a block diagram of an integrated circuit that obtains a unique ID from an external smart device.

FIG. 2f is a block diagram that illustrates a secure scheme of transferring the unique ID from an external "smart" device to the control circuit. To avoid attacks on the interface between control circuit 700 and "smart" storage device 750, the unique ID itself is encrypted and only then transferred on the interface by the following scheme, as an example. Control circuit 700 is coupled with "smart" storage device 750, which includes an encrypt/decrypt engine 760. In one embodiment, engine 760 is a Triple-DES encryption/decryption engine; however, other encryption techniques known in the art, for example, AES can be used. The two devices (700 and 750) share a common secret (i.e., the paired ID, S) that is used to protect the movement of the unique ID, K, from the storage device 750 to the control circuit 700. This common secret could be programmed, at system-install time by, for example, the content provider. The weak point in the embodiment of FIG. 2f is this shared secret, but not the unique ID itself.

In one embodiment, the connection between storage device 750 and control circuit 700 complies to a standard interface known in the art, for example, I2C, ISO 7816-3 or SPI. In alternate embodiments, other standard interfaces or a proprietary interface can be used.

Control circuit 700 includes encrypt/decrypt engine 720 that operates using the same encryption technique as engine 760 of device 750. In one embodiment, engine 720 of control circuit 700 is implemented as hardware and engine 760 of storage device 750 is implemented as micro-controlled firmware. In alternate embodiments, any combination of hardware and/or firmware implementations can be used. Control circuit 700 also includes random number generator 730 that generates random number (R). Any random number generator known in the art can be used.

Control circuit 700 and storage device 750 share a common secret number (S), which is stored in the control circuit (ID 710) as well as the "smart" storage device (ID 780). In one embodiment, the number S is a 64-bit number; however, any size can be used. As described in greater detail below, storage device 750 provides an encrypted copy of unique ID (K) 770 to the control circuit 700, thereby making the transfer of the unique ID secure. Control circuit 700 then uses this unique ID 770 to encrypt A/V data as described above.

One embodiment of a technique for secure transfer of the unique ID 770 to control circuit 700 is described. Variations of the technique can also be used. On boot-up, control circuit 700 generates a random number (R) using the random number generator 730. This random number is encrypted using the paired ID (S) 710 with the encrypt/decrypt engine 720 and is transmitted to the device 750. Device 750 then decrypts random number, R, with encrypt/decrypt engine 760 and using the paired ID, S. Then "smart" storage device 750 encrypts unique ID (K) 770 with encrypt/decrypt engine 760 and using the random number R before sending it to control circuit 700. Control circuit 700 decrypts the unique ID, K, using encrypt/decrypt engine 720 and the random number R. It must be noted that since random numbers are used, the transfer of unique ID over the interface will look different to a hacker every time its transferred at the beginning of a session.

Figure 3A:
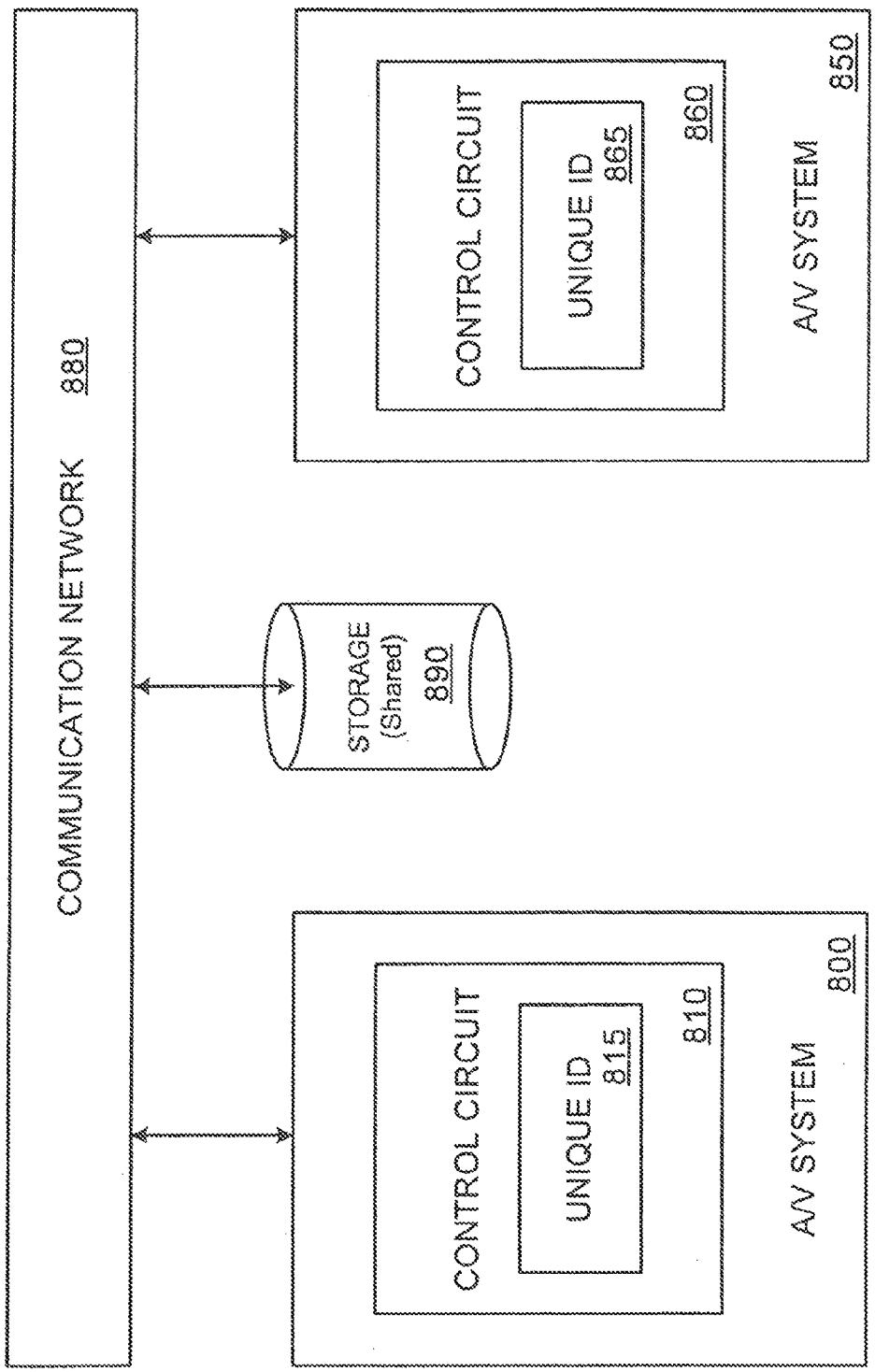
FIG. 3a is a block diagram of multiple personal audio/video systems sharing a common storage.

FIG. 3a is a block diagram of multiple personal audio/video systems sharing a storage device. It is illustrated how unique ID can be useful in preventing unauthorized content sharing, despite the storage being shared by the two systems. This system interconnection, as illustrated in FIG. 3a, may occur, for example, in a home where multiple family members have personal audio/video systems and share a common storage (e.g., a server, a network interface, a hard disk, a removable storage medium alternately used by multiple devices).

Communications network 880 couples storage device 890 with A/V system 800 and A/V system 850. Communications network 880 can be any type of medium, whether wired or wireless, capable of communicating data between electronic devices. For example, communications network 880 can be one or more network cables, or communications medium can be one or more wireless network devices (e.g., IEEE 802.11 wireless LAN, HomeRF, Bluetooth). Any number of storage devices and/or A/V systems can be coupled with the communications network 880.

Storage device 890 can be any type of storage device capable of storing A/V content, whether fixed or removable.

Storage device 890 can be part of a larger system (e.g., a server) or storage device 890 can be a stand-alone storage device.

A/V system 800 includes control circuit 810 and unique ID 815. The implementation of control circuit 810 and unique ID 815 can be any of the configurations described above. A/V system 800 can also include components in addition to those illustrated in FIG. 3*a*. A/V system 800 is coupled to communicate using communications network 880, for example, via a network interface card (not shown in FIG. 3*a*) or any other appropriate component.

Similarly, A/V system 850 includes control circuit 860 and unique ID 865. The implementation of control circuit 860 and unique ID 865 can be any of the configurations described above. A/V system 850 can also include components in addition to those illustrated in FIG. 3*a*. A/V system 850 is coupled to communicate using communications network 880, for example, via a network interface card (not shown in FIG. 3*a*) or any other appropriate component.

A/V system 800 and A/V system 850 can operate independently to record, playback, store, and/or otherwise use A/V data. When the A/V content is to be stored on shared storage 890 in a secure manner, the unique IDs of each A/V system are used to encrypt the content before writing out to storage 890. In a simple embodiment, A/V system 800 and A/V system 850 do not share encrypted data stored on storage device 890. In other words, content stored by A/V system 800 is not usable by A/V system 850 because A/V system 850 does not have access to the unique ID 815.

In more sophisticated embodiments, A/V system 800 and A/V system 850 are capable of sharing encrypted data stored on storage device 890. For example, ID 815 and ID 865 can be the same number (thereby not being unique), or techniques can be used whereby unique IDs can be shared between A/V system 800 and A/V system 850.

Figure 3B:
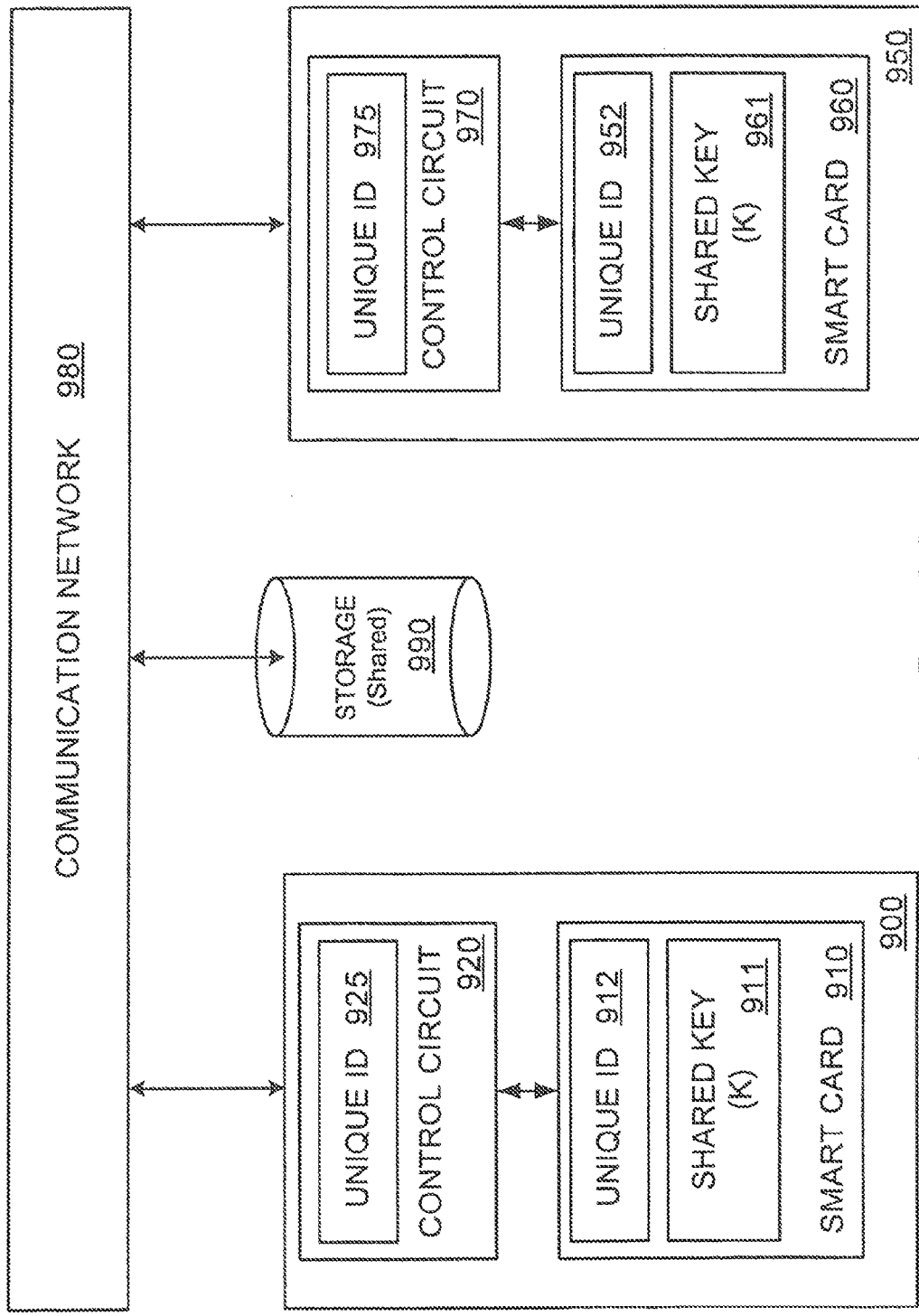
FIG. 3b is a block diagram of multiple personal audio/video systems sharing a common storage and using smart media to authorize encryption and decryption.

FIG. 3*b* is a block diagram of multiple personal audio/video systems sharing a storage device and using smart media to authorize encryption and decryption. It is illustrated how unique ID can be employed to facilitate content sharing securely. As described above, communications network 980 and storage device 990 can be any type of communications medium and storage device, respectively. Also, any number of A/V systems and storage devices can be supported. One of the things that the scheme of content sharing is hinged on is the smart-cards, that under the control of content provider is required to issue shared/family key(s) dynamically. For example, in the embodiment of FIG. 3*b* the content sharing is facilitated by the shared key (K) that both smart-cards 910 and 960 are capable of sending to their paired control circuits 920 and 970, respectively. It is the interface between the control circuit and the smart card in these two systems that then becomes the weak point of the scheme. In the scheme illustrated below this interface is protected by using the unique ID of the corresponding control circuit.

A/V system 900 includes control circuit 920 which in turn contains a unique ID 925. The configuration of control circuit 920 and unique ID 925 can be any of the configurations described above. In one embodiment, A/V system 900 also includes an interface to communicate with the smart card 910. The smart-card is programmed at install time with ID 912 same as that of the control circuit. Under the control of the content provider the smart-card is capable of issuing shared key, K, 911 common among a group of systems.

Smart card 910 is coupled with integrated circuit 920 via a secure link. The secure link can be any type of secure communications path between smart card 910 and integrated circuit 920, for example, the secure links described above. In one embodiment, the shared key, K, passed over the secure link from smart card 910 to control circuit 920 and is encrypted using unique ID 912, that is, "Encrypt(K,UID912)".

By passing the shared key to control circuit 920 using the unique ID 912, the shared key 911 can be then used to encrypt the content before storing it on the shared storage device 990. Once control circuit 920 obtains the shared key, control circuit 920 stores the shared key in some internal register or memory such that the shared key is not easily accessible to an unauthorized party, thereby maintaining the security of the encrypted data.

Likewise, A/V system 950 includes control circuit 970 with a unique ID 975 that is paired with a smart-card 960 containing the same unique ID 952. The configuration of control circuit 970 and unique ID 975 can be any of the configurations described above. In one embodiment, A/V system 950 also includes an interface to communicate with the smart card 960, which is programmed with the unique ID 952 same as that of the control circuit 970. In an alternate embodiment, another type of media other than a smart card can be used to store unique ID 952.

In one embodiment, smart card 960 is coupled with control circuit 970 via a secure link. The secure link can be any type of secure communications path between smart card 960 and control circuit 970, for example, the secure links described above. In one embodiment, shared key (K) 961 is passed over the secure link from smart card 960 to control circuit 970 and is encrypted using unique ID 952, that is "Encrypt(K, UID952)".

Content communicated between A/V system 900 and storage device 990 as well as between A/V system 950 and storage device 990 is encrypted using the shared key, that is ("E(content, K)"). Furthermore, every movement of keys across two components is protected by suitably encrypting the value with the unique ID. Content stored on storage device 990 is encrypted using K. Since both A/V systems 900 and 950 have a copy of K, any content stored on the shared storage 990 and encrypted using K can be used by both A/V systems 900 and 950.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus for processing audio/video content, comprising:

a control circuit that is arranged to derive an ID associated with an audio/video system from a combination of at least one unique system value of one or more hardware components of the audio/video system and at least one unique system value of one or more software components of the audio/video system, wherein if a length of the ID is less than a predetermined length of a key for cryptographic operations, employing a plurality of unique system values to adjust the ID length to be equivalent to the key length; and a memory for storing the ID, wherein the ID is operative as the key that is directly used by the control circuit to enable performing both encryption and decryption cryptographic operations on the audio/video content to be sent from and retrieved by the audio/video system.

2. The apparatus of claim 1, wherein the memory comprises at least one of the following: a ROM, a DDR, an SDRAM, and an EEPROM.

3. The apparatus of claim 1, wherein the control circuit is further arranged to send encrypted audio/video content to a storage device and retrieve encrypted audio/video content from the storage device.

4. The apparatus of claim 1, wherein the control circuit further comprises an application specific integrated circuit (ASIC).

5. The apparatus of claim 1, wherein the control circuit and the memory are manufactured on different die.

6. The apparatus of claim 1, wherein the at least one unique system value of the one or more hardware components comprises one or more serial numbers associated with the one or more hardware components.

7. The apparatus of claim 1, wherein the control circuit is further arranged to receive from a removable medium another key encrypted using the ID; decrypt the other key using the ID; and use the other key to encrypt the audio/video content to be stored on a storage device.

8. The apparatus of claim 1, wherein the control circuit is further arranged to receive the audio/video content over a secure communications medium.

9. An apparatus for processing audio/video content, comprising:
a memory for storing an ID associated with an audio/video system; and
a control circuit that is coupled with the memory on a single integrated circuit package, the control circuit is arranged to derive the ID from a combination of at least one unique system value of one or more hardware components of the audio/video system and at least one unique system value of one or more software components of the audio/video system, wherein the ID is operative as a key that is directly used by the control circuit to enable performing both encryption and decryption cryptographic operations on the audio/video content to be sent from and retrieved by the audio/video system, and wherein if a length of the ID is less than a predetermined length of a key for cryptographic operations, employing a plurality of unique system values to adjust the ID length to be equivalent to the key length.

10. The apparatus of claim 9, wherein the control circuit and the memory are manufactured on a common die.

11. The apparatus of claim 9, wherein the memory comprises at least one of the following: a ROM, a DDR, an SDRAM, and an EEPROM.

12. The apparatus of claim 9, wherein the control circuit is further arranged to send encrypted audio/video content to a storage device and retrieve encrypted audio/video content from the storage device.

13. The apparatus of claim 9, wherein the control circuit further comprises an application specific integrated circuit (ASIC).

14. The apparatus of claim 9, wherein the at least one unique system value of one or more hardware components comprises one or more serial numbers associated with the one or more one hardware components.

15. The apparatus of claim 9, wherein the control circuit is further arranged to receive from a removable medium another key encrypted using the ID; decrypt the other key using the ID; and use the other key to encrypt the audio/video content to be stored on a storage device.

16. The apparatus of claim 9, wherein the control circuit is further arranged to receive the audio/video content over a secure communications medium.

17. A processor readable non-transitory storage media that includes a plurality of executable instructions, wherein the execution of the instructions enables operations for processing audio/video content, the operations comprising:
storing in a memory an ID associated with an audio/video system;
employing a control circuit to derive the ID based on a combination of at least one unique system value of one or more hardware components of the audio/video system and at least one unique system value of one or more software components of the audio/video system, wherein if a length of the ID is less than a predetermined length of a key for cryptographic operations, employing a plurality of unique system values to adjust the ID length to be equivalent to the key length; and
employing the control circuit to directly use the derived ID that is operative as the key to enable performing both encryption and decryption cryptographic operations on the audio/video content to be sent from and retrieved by the audio/video system.

18. The processor readable non-transitory storage media of claim 17, wherein the operations further comprise:
storing the encrypted audio/video content on a storage device; and
retrieving the encrypted audio/video content from the storage device.

19. The processor readable non-transitory storage media of claim 17, wherein the at least one unique system value of one or more hardware component comprises one or more serial numbers associated with the one or more hardware component.

20. The processor readable non-transitory storage media of claim 17, wherein the operations further comprise:
receiving from a removable medium another key encrypted using the ID;
decrypting the other key using the ID; and
using the other key to encrypt the audio/video content to be stored on a storage device.

* * * * *